United States Patent [19]

Pitavy et al.

[11] Patent Number: 4,764,322
[45] Date of Patent: Aug. 16, 1988

[54] PROCESS FOR MANUFACTURING HOLLOW PLASTICS ARTICLES

[75] Inventors: Michel Pitavy, Vaucresson, France; Mario Chiappino; Luigi Aghemo, both of Turin, Italy

[73] Assignees: Luchaire S.A., Paris, France; AG International S.p.A., Nichelino, Italy

[21] Appl. No.: 936,829

[22] Filed: Dec. 2, 1986

[30] Foreign Application Priority Data

Dec. 2, 1985 [FR] France ................. 85 17782

[51] Int. Cl.$^4$ ........................................ B29C 41/04
[52] U.S. Cl. ................................ 264/71; 264/310; 264/311; 425/429
[58] Field of Search .............. 264/310, 311, 69, 71, 264/72; 425/429

[56] References Cited

U.S. PATENT DOCUMENTS

| | | | |
|---|---|---|---|
| 3,072,965 | 1/1963 | Miller . | |
| 3,217,078 | 11/1965 | Kleiber | 264/310 |
| 3,316,339 | 4/1969 | Breneman | 264/310 |
| 3,337,662 | 8/1967 | Spencer | 264/71 |
| 3,456,046 | 7/1969 | Rosen | 264/310 X |
| 3,734,665 | 5/1973 | Guillaud | 425/174 |
| 3,909,179 | 9/1975 | Chujoo et al. | 425/429 |
| 4,146,565 | 3/1979 | Quraishi | 264/310 |
| 4,292,015 | 9/1981 | Hritz | 425/73 |
| 4,294,793 | 10/1981 | Takazawa | 264/311 |

FOREIGN PATENT DOCUMENTS 842347  7/1960  United Kingdom .

Primary Examiner—Jan H. Silbaugh
Assistant Examiner—Mary Lynn Fertig
Attorney, Agent, or Firm—Pearne, Gordon, McCoy & Granger

[57] ABSTRACT

A process for producing a hollow plastics article, which comprises introducing a polymerizable composition in the hot state into a sealed hot mould, immediately setting the mould in motion by imparting to it a second movement of rotation about a second axis and a third movement of oscillation about a third axis which is perpendicular to the second, so that the composition is applied to the inner walls of the mould, and polymerizing it herein to form a hollow article. The improvement comprises setting the mould in motion by further imparting to it, simultaneously to the second and third movement, a first horizontal movement which has, in a horizontal plane, two components in two directions perpendicular to each other.

5 Claims, 5 Drawing Sheets

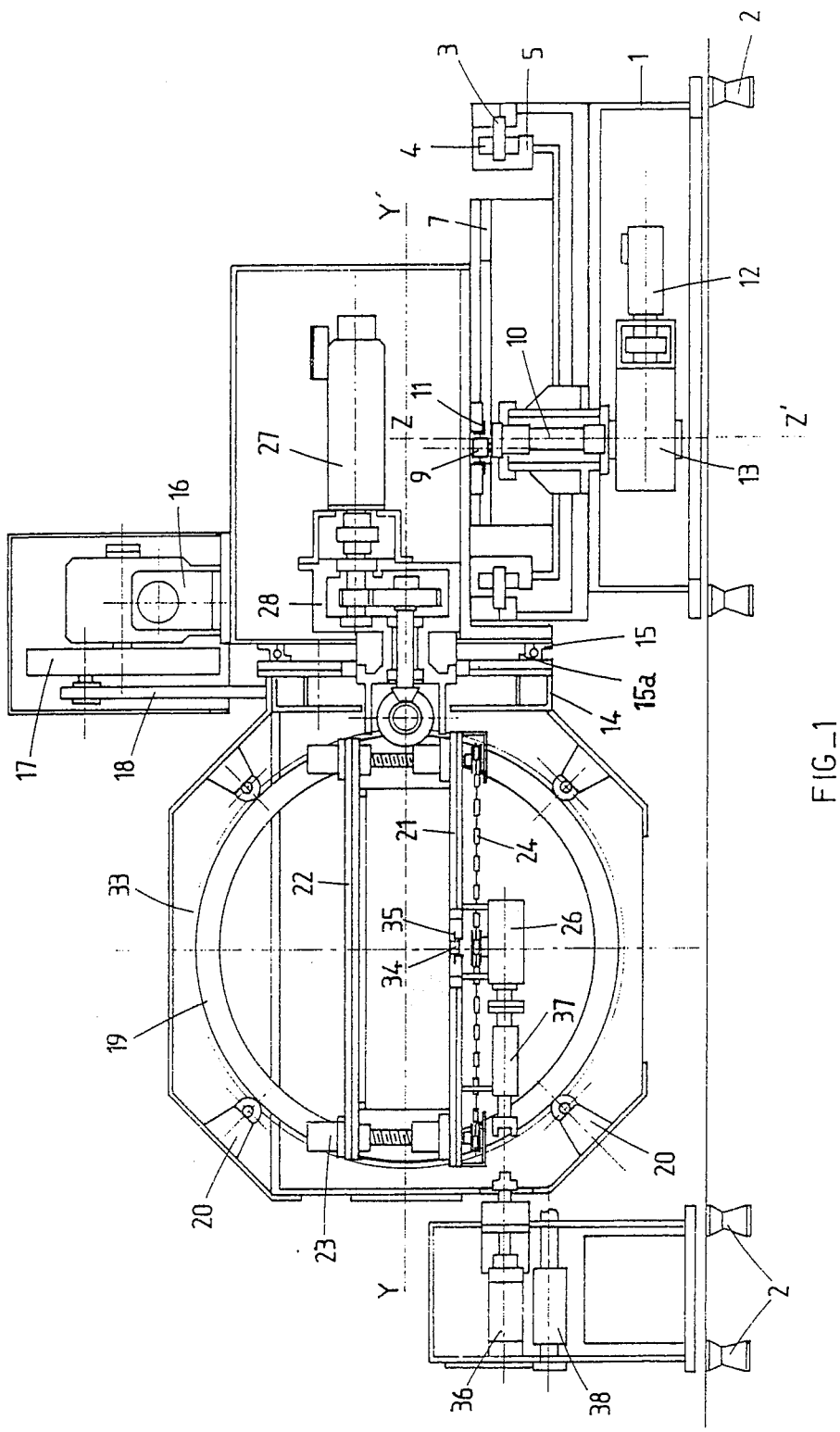
FIG_1

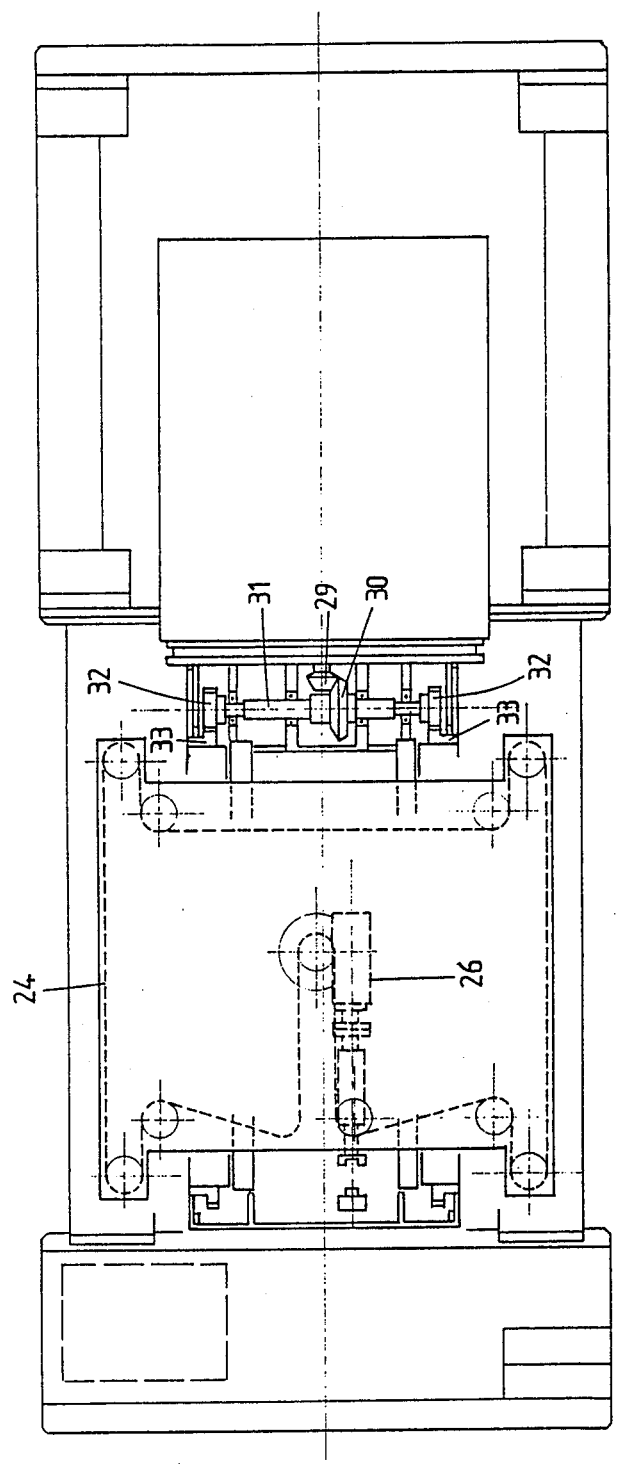
FIG_2

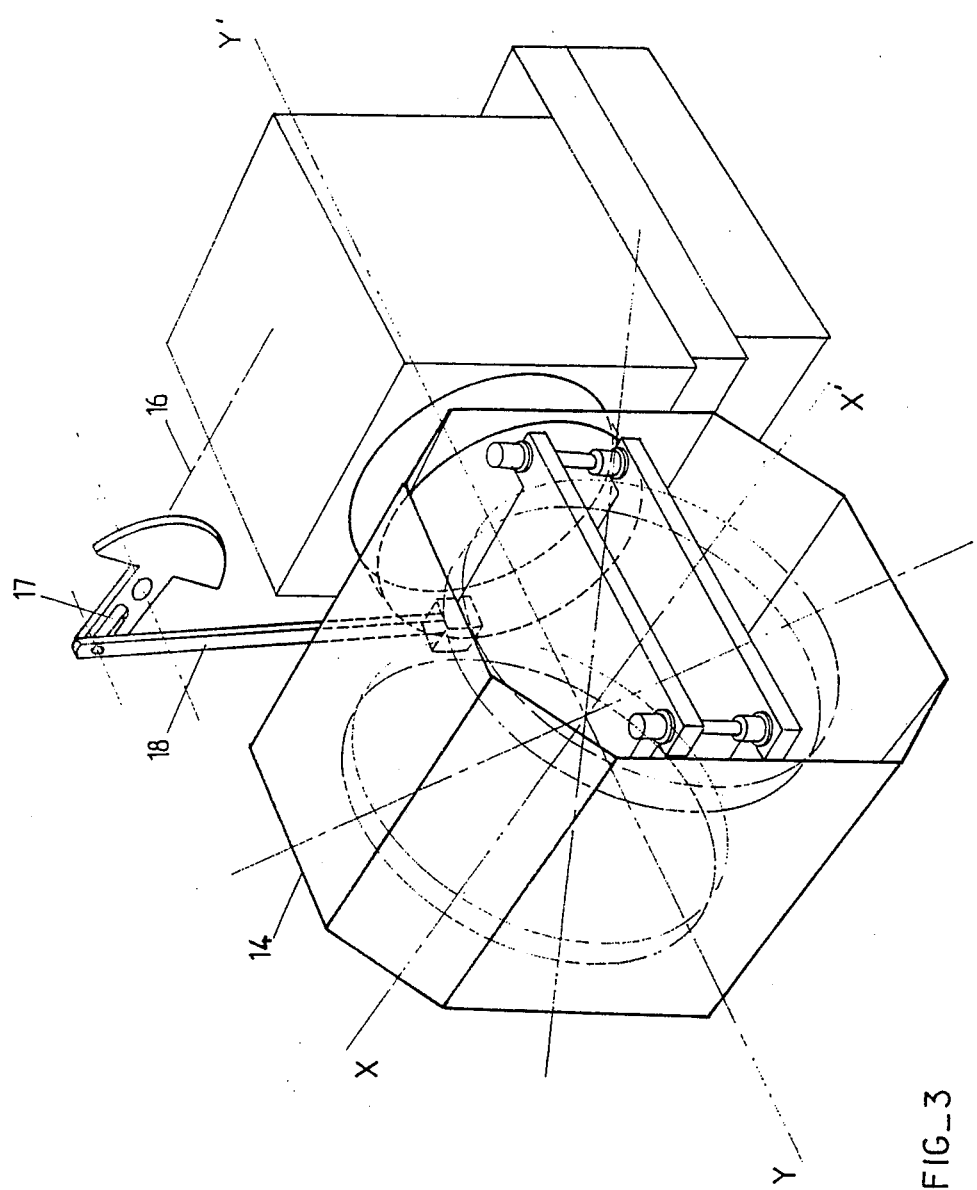
FIG_3

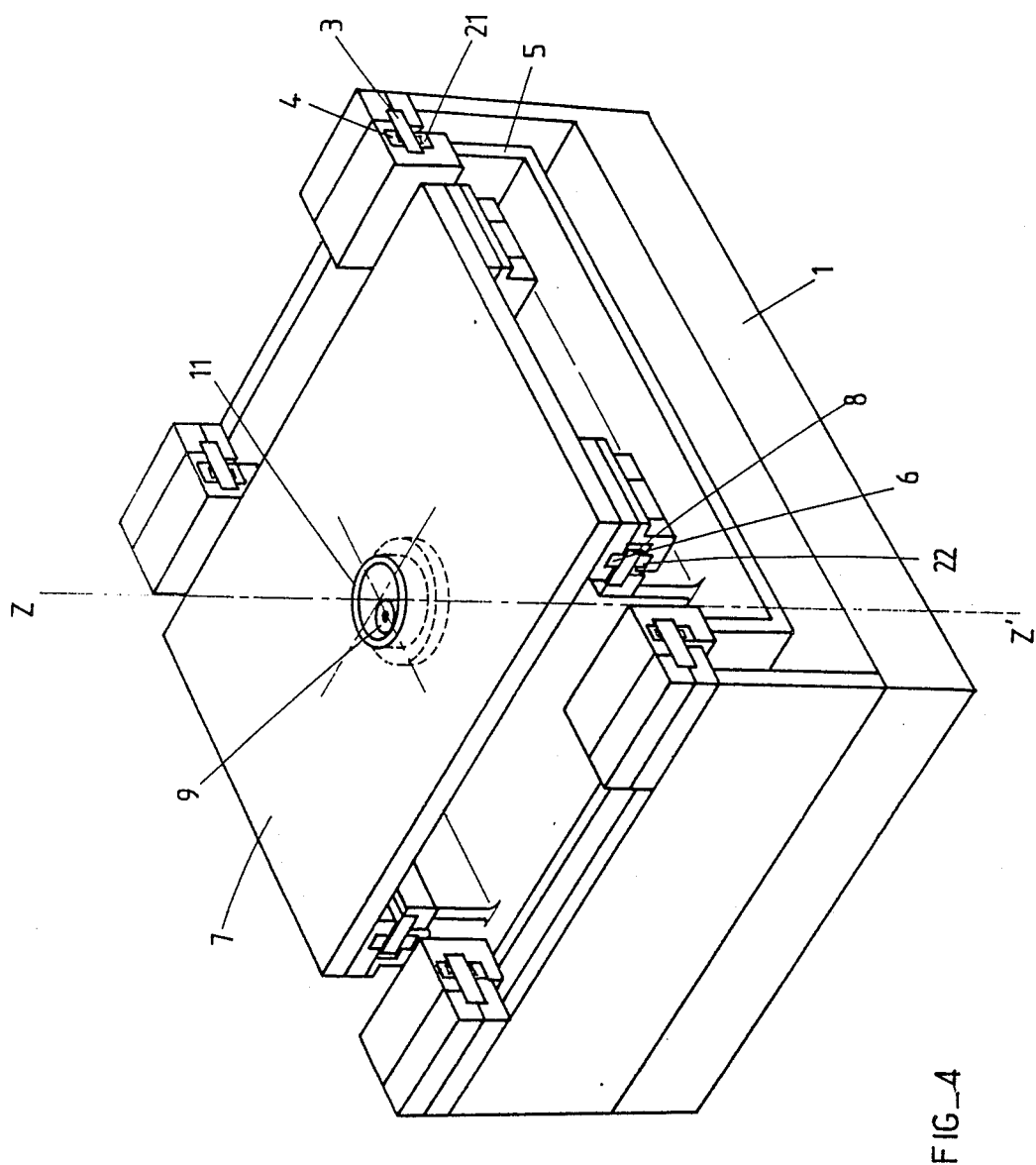
FIG_4

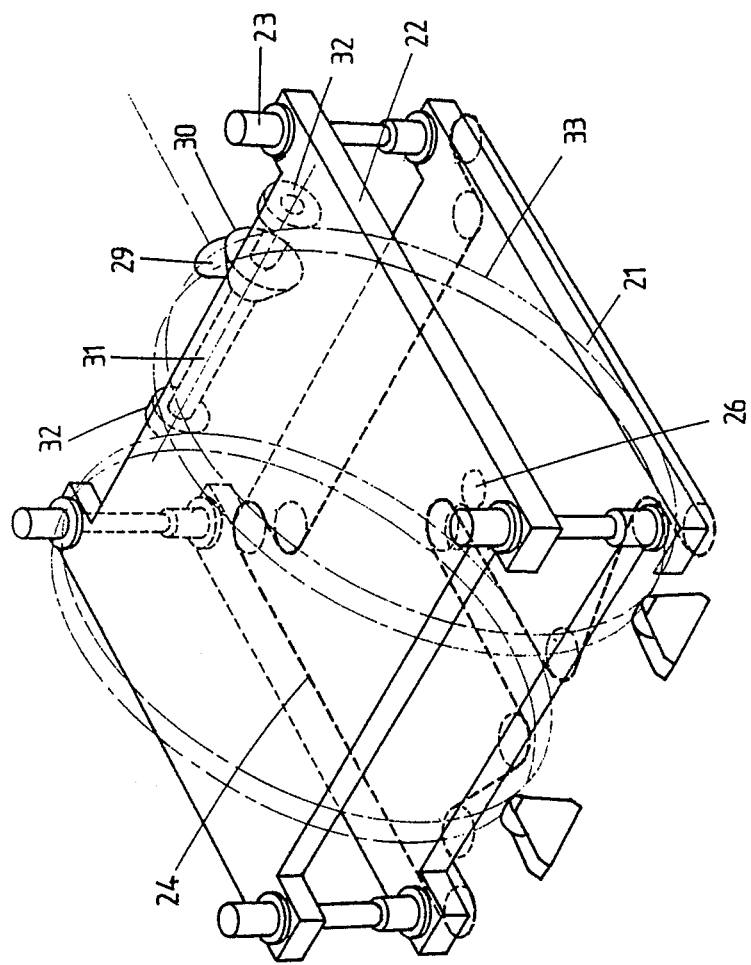
FIG_5

PROCESS FOR MANUFACTURING HOLLOW PLASTICS ARTICLES

This invention relates to processes and machinery for producing hollow plastics articles.

A process for producing hollow plastics articles is already known, which consists in introducing a polymerisable composition into a sealed hot mould the interior of which has the shape of the exterior of the part which is to be produced, rotating the mould relative to two orthogonal axes so as to apply the composition to the entire inner wall of the mould and polymerising the composition therein under the effect of heat to form a hollow article and then, after cooling, removing the hollow article from the mould.

This technique is advantageous since it does not exert any pressure on the polymerisable composition or the moulds.

The rotation of the mould does not result in a sufficiently thick deposit of polymerisable composition over the inner wall of the mould, particularly when the composition is in liquid form, even if the rotation speeds relative to the two rotation axes are suitably programmed. Moreover, on cooling, certain plastics, especially polyamides, show some shrinkage proportional to the dimensions of the article and the thickness of the layer. When two adjacent parts of an article are of different thicknesses, the shrinkage may lead to internal tensions giving rise to undulations or folds on the surface of the article. The surface appearance suffers accordingly; consequently, this process is not suitable for producing articles in which the surface appearance is critical, for example parts of the bodywork of a vehicle, such as passenger doors and rear doors which, in the assembled state, are clearly visible.

The invention remedies this disavantage by providing a process for manufacturing hollow plastics articles which, in order to apply a polymerisable composition to the inner wall of the mould, still makes use of movement of the mould without exerting any pressure and which has the corresponding advantages of simplicity and safety of manufacture, but which nevertheless results in lightweight articles the quality and surface appearance of which are such that after a primer and paint have been applied these components may be used particularly in the car industry, and even as external components or bodywork facing components.

The invention therefore relates to a process which consists in introducing a polymerisable composition in the hot state into a sealed hot mould, immediately moving the mould so that the composition is applied to the inner wall of the mould and polymerising it therein to form a hollow article. It is characterised in that the mould is moved by imparting a first movement having two components, in a horizontal plane, in two directions perpendicular to each other.

This first movement, following two perpendicular axes, which is referred to hereinafter as an "orbital movement", is therefore not a simple back-and-forth movement, which would not be sufficient, and it is provided at a first angular speed.

The invention also relates to the combination of this first orbital movement with a second movement of rotation at a second angular speed about a second axis and a third movement of oscillation at a third angular speed about a third axis which is perpendicular to the second axis. The first angular speed of the orbital movement is higher than at least one of the second and third angular speeds so as to cause a better local distribution of the polymerisable composition by spreading it in every direction.

Depending on the geometry of the article and other parameters, accidental or deliberate unevenness in the thickness of the wall of the hollow article may occur but, thanks to the process according to the invention, a relative variation in thickness can be kept sufficiently low to ensure that the local differences of shrinkage do not result in tensions which may give rise to undulations on the outer surface of this part of the finished article.

In a preferred variant, the polymerisable composition is a liquid composition. This greatly improves the effect of local distribution of the composition in every direction caused by the orbital movement. More specifically, liquid polymerisable compositions are used which yield polyamides, especially polyamide 6 and polyamide 12.

The first stage of the process according to the invention consists in introducing a polymerisable composition in the hot state into a sealed hot mould.

The mould is usually in two or more parts. It may be heated by any suitable means, for example by means of a hot oil jacket or by placing the mould in a heated enclosure. The temperature of the mould depends on the nature of the polymerisable composition. For a composition which polyermises to form a polyamide, mould temperatures from 140° to 200° C. and especially from 150° to 180° C. may be used. The composition is introduced into the mould through a removable inlet channel.

The polymerisable composition is a conventional composition. It is preferably a composition capable of polymerising to form a polyamide. In this case it will include a monomer, a catalyst and an activator to which charges and other additives such as polyurethane or glass fibers may possibly be added.

The monomer is preferably a lactam. Caprolactam or laurolactam are particularly preferred.

The catalyst is usually a polyisocyanate, preferably a diisocyanate, for example an alcohol diisocyanate an aryl diisocyanate, an alkylaryl diisocyanate, etc. The catalyst is present in a catalytically active quantity, for example in an amount from 0.5 to 2.5 parts by weight to 100 parts by weight of monomer.

The activator is usually an alkali metal lactamate; it is present in an active quantity, for example in an amount from 0.1 to 1 part by weight per 100 parts by weight of monomer.

The quantity of polymerisable composition introduced into the mould advantageously represents from 1 to 15%, preferably from 1 to 5% of the volume of the cast of the mould, depending on the thickness of the walls of the hollow article which is to be produced, and depending on the geometry thereof.

As soon as all the polymerisable composition has been added, the mould is set in motion by imparting to it the orbital movement, preferably combined with movements of oscillation and rotation, in order to ensure that the polymerisable composition is adequately distributed over the inner walls of the mould.

Generally, this movement will last from 100 to 300 seconds. The movement of the mould is then stopped. If necessary, the operation of adding the composition and setting the mould in motion may be repeated for several successive polymerisation processes. The mould is cooled to a temperature, for example between 70° C. and 120° C., at which the article is sufficiently rigid to be removed from the mould. The mould is opened and the article is taken out.

The invention also relates to an apparatus for producing a hollow plastics article, which comprises a mould and a mechanism intended to set the mould in motion characterised in that the mechanism is arranged so as to impart to the mould first or orbital movement along a circular or elliptical path about a vertical axis which passes through the mould.

The machine also preferably comprises means for imparting to the mould the second and third movements in accordance with the inventive process as described above. Accordingly, the machine provides improved local distribution of the polymerisable composition in every direction within the mould.

With the invention it is possible for the first time to produce, from plastics material, a hollow element of the bodywork of a motor vehicle, notably a rear door or passenger door in a single piece, the surface appearance of which, after a primer and top coat of paint have been applied, satisfies the requirements imposed by the motor vehicle manufacturers.

In the accompanying drawings, given solely by way of example:

FIG. 1 is a section through an apparatus according to the invention,

FIG. 2 is a plan view of the apparatus of FIG. 1,

FIG. 3 is a diagramatic perspective view of the apparatus according to the invention, FIG. 4 is a perspective view of part of the machine which produces the orbital movement, and FIG. 5 is a perspective plan of the apparatus illustrating the attachment of the mould.

The machine comprises a fixed stand 1 connected to the ground by fixing jacks 2. The stand 1 comprises two parallel guide belts 3 on which roller runners 4 run, which are integral with a carriage 5.

Roller runners 6 integral with a carriage 7 run along two guide belts 8 perpendicular to the guide belts 3 and integral with the carriage 5.

The movement is transmitted to the carriages 5 and 7 by a roller 9 which is integral for rotation with a shaft 10 and eccentrically mounted relative to said shaft. The roller 9 cooperates with the inner wall of a circular crown 11 which is integral with the carriage 7 and with a circular crown integral with the carriage 5 and having the same vertical axis z, z' as the crown 11. The shaft 10 is rotationally driven by a motor 12 via a stepping down gear 13.

Adjustment of the distance of the roller 9 from the axis z—z' makes it possible to modify the range of movement of the carriage 7. The same is true of the carriage 5. Adjustment of the speed of the motor 12 makes it possible to regulate the frequency of these movements.

The carriage 7 is connected by a cross-roller bearing to a drum 14, the outer cage 15 of this bearing being connected to the carriage 7 whilst the inner cage 15a is connected to the drum 14. Consequently, the drum 14 follows the movements of the carriage 7, whilst remaining capable of independent rotation and oscillation.

A direct current electric motor 16 drives an eccentric 17. A connecting rod 18 articulated on the eccentric 17 and on the drum 14 enables the latter to oscillate about the axis y, y'. The amplitude of the oscillating movement can be regulated by the position of the eccentric 17, whereas the frequency and speed of this movement can be regulated by means of the variable speed of the direct current motor 16.

A cylindrical drum 19 bears on cylindrical rollers 20 fixed on the drum 14. A mould holder consisting of a fixed plate 21 and a movable plate 22, which can be brought closer to the plate 21 by tightening screws 23 which are rotationally driven during tightening by a chain 24 set in motion by a stepping down gear 26, is arranged inside the drum 19. A direct current motor 27 drives a conical pinion 29, via a stepping down gear 28, the axis of the pinion 29 coinciding with the axis y, y'. The conical pinion 29 meshes with a conical wheel 30 integral with a shaft 31 which supports straight pinions 32. These straight pinions mesh with serrated crowns 33 carried by the cylindrical drum 19.

The apparatus therefore enables the mould to be subjected simultaneously to a variable movement of rotation relative to an axis x, x', a variable movement of oscillation relative to the axis y, y' which is perpendicular to the axis x, x', this movement of oscillation possibly being replaced by a movement of rotation, and an orbital movement having two orthogonal components in a horizontal plane, the angular speed of the shaft 10 being higher than the angular speeds imparted by the motors 16 and 27.

It is possible to achieve the orbital movement by means of carriages travelling along axes which are not perpendicular since two components of movement perpendicular to each other will still be obtained.

In order to enable the moulds to be introduced into the mould holder, the moulds are provided with guide rollers 34 which cooperate with the rails 35 of the mould holder.

The stepping down gear 26 is set in motion by a hydraulic motor 36 which engages with a shaft 37 via a jack 38. As soon as the mould is gripped by the mould holder, the jack 38 is retracted and uncouples the motor from the shaft 37, thus enabling the program for producing a component to begin by setting the mould in motion.

The moulds used are in two parts, having a duct which enables the interior of the mould to communicate with the exterior and enabling the mould to be filled with a polymerisable liquid.

We claim:

1. A process for producing a hollow plastics article, which comprises introducing a polymerisable composition in the hot state into a sealed hot mould, immediately setting the mould in motion by simultaneously imparting to the mould an orbital movement about a first axis with a first angular speed, said orbital movement having in a horizontal plane two components in directions perpendicular to each other, a rotational movement about a second axis with a second angular speed and an oscillatory rotational movement with a third angular speed about a third axis which is perpendicular to the second axis, said first angular speed being higher than at least one of the second and third angular speeds.

2. The process of claim 1, which comprises introducing a liquid composition into the mould.

3. The process of claim 2, wherein the plastics material is polyamide.

4. The process of claim 3, wherein the plastics material is polyamide 6 or polyamide 12.

5. The process of claim 1, wherein the orbital movement imparts to the mould a circular or elliptical path with a vertical axis, said vertical axis passing through the mould to cause a better local distribution of the polymerisable composition in every direction.

* * * * *